(12) United States Patent
Sheng et al.

(10) Patent No.: US 9,226,035 B2
(45) Date of Patent: Dec. 29, 2015

(54) ONE-BUTTON INFORMATION INTERACTIVE METHOD AND SYSTEM

(71) Applicant: GUANGZHOU DINGYI ELECTRONICS CO., LTD., Guangzhou, Guangdong Province (CN)

(72) Inventors: Jiarui Sheng, Guangzhou (CN); Mengjie Zhou, Guangzhou (CN); Ying Yang, Guangzhou (CN); Liu Yang, Guangzhou (CN); Jie Xu, Guangzhou (CN); Jiamin Zhou, Guangzhou (CN)

(73) Assignee: GUANGZHOU DINGYI ELECTRONICS CO., LTD., Guangzhou, Guangdong Province (CN)

( * ) Notice: Subject to any disclaimer, the term of this patent is extended or adjusted under 35 U.S.C. 154(b) by 0 days.

(21) Appl. No.: 14/543,191

(22) Filed: Nov. 17, 2014

(65) Prior Publication Data

US 2015/0163552 A1    Jun. 11, 2015

(30) Foreign Application Priority Data

Dec. 6, 2013   (CN) .......................... 2013 1 0661347

(51) Int. Cl.
*H04N 21/274*   (2011.01)
*H04N 21/4227*   (2011.01)
(Continued)

(52) U.S. Cl.
CPC ............ *H04N 21/4788* (2013.01); *H04L 67/10* (2013.01); *H04N 5/4403* (2013.01); *H04N 21/218* (2013.01); *H04N 21/2381* (2013.01); *H04N 21/2387* (2013.01); *H04N 21/23109* (2013.01); *H04N 21/25808* (2013.01);
(Continued)

(58) Field of Classification Search
CPC ....................... H04N 21/25808; H04N 5/4403
USPC .......................................................... 725/34
See application file for complete search history.

(56) References Cited

U.S. PATENT DOCUMENTS

| 2004/0086091 | A1* | 5/2004 | Naidoo ............ G08B 13/19669 379/37 |
| 2005/0235060 | A1* | 10/2005 | Brown ................. A61B 5/0002 709/224 |

(Continued)

FOREIGN PATENT DOCUMENTS

CN          104301683 A  *  1/2015

*Primary Examiner* — Nathan Flynn
*Assistant Examiner* — Caroline Somera
(74) *Attorney, Agent, or Firm* — Muncy, Geissler, Olds & Lowe, P.C.

(57) ABSTRACT

The present invention refers to a one-button information interactive method and system. The method includes steps as follow: based on a multimedia-file uploading interface activated by the children, the client adds a corresponding multimedia classification marker to a file header of a multimedia file selected by the children; the server saves the multimedia file in the specified storage space based on the username of the client and the multimedia classification marker, and marks a reading states of the multimedia file; the server retrieves an unread marker, and transmits an information reminding instruction to the net-media player corresponding to the username of the client; a remote controller receives a key signal outputted by the elderly; the net-media player reads the multimedia file with the unread marker from the specified storage space based on the first control signal, and plays the multimedia file with the unread marker via a television in descending order of uploading time. The elderly can watch the new multimedia file transmitted by the children far off in time by pressing one button.

10 Claims, 2 Drawing Sheets

(51) Int. Cl.
*H04N 21/47* (2011.01)
*H04N 21/4788* (2011.01)
*H04L 29/08* (2006.01)
*H04N 5/44* (2011.01)
*H04N 21/218* (2011.01)
*H04N 21/231* (2011.01)
*H04N 21/2381* (2011.01)
*H04N 21/2387* (2011.01)
*H04N 21/258* (2011.01)
*H04N 21/2668* (2011.01)
*H04N 21/41* (2011.01)
*H04N 21/422* (2011.01)
*H04N 21/63* (2011.01)
*H04W 8/08* (2009.01)
*H04N 21/2743* (2011.01)
*H04N 21/482* (2011.01)

(52) U.S. Cl.
CPC ...... *H04N21/25866* (2013.01); *H04N 21/2668* (2013.01); *H04N 21/2743* (2013.01); *H04N 21/4108* (2013.01); *H04N 21/4135* (2013.01); *H04N 21/4221* (2013.01); *H04N 21/482* (2013.01); *H04N 21/632* (2013.01); *H04W 8/08* (2013.01); *H04N 2005/4414* (2013.01)

(56) References Cited

U.S. PATENT DOCUMENTS

2008/0294462 A1* 11/2008 Nuhaan .......... G06Q 10/063114
    705/3
2013/0125158 A1* 5/2013 Brown ................ A61B 5/0002
    725/14

* cited by examiner

ONE-BUTTON INFORMATION INTERACTIVE METHOD AND SYSTEM

TECHNICAL FIELD

The present invention refers to smart home technology.

BACKGROUND

A percentage of seniors are 13.2% in China, meaning 1.7 billion seniors in total, which gains attention from the government and the public. Recently, more and more corporations, research institutions and individuals tend to research and develop products and systems such as elderly products and care products. The elderly care involves in issues and requirements such as monitoring vital signals and environmental security, and analyzing a behavior tendency.

However, conventional care products focus on monitoring the elderly activity situation. The care products don't alarm until the elderly has health problem. Their children care little about them, resulting in lack of communication between the elderly and their children. Furthermore, as a development of the technology, electronic products become more and more unfriendly for the elderly. The elderly will have no interest in the unfriendly electronic products. They are less likely to communicate and interact with their children who are far off.

SUMMARY OF THE INVENTION

To overcome the defects described above, the present invention provides a one-button information interactive method and system which is friendly for elderly, and makes it convenient for elderly to communicate with the children far off.

Some embodiments of the present invention refer to:

A one-button information interactive method, comprising:

step 1, a client establishes communication with a server, and the server gets a username of the client;

step 2, based on a multimedia-file uploading interface activated by a first user, the client adds a corresponding multimedia classification marker to a file header of a multimedia file selected by the first user, and uploads the multimedia file with the multimedia classification marker to the server;

step 3, the server saves the multimedia file in the specified storage space based on the username of the client and the multimedia classification marker, and marks a multimedia file which has not been read by a net-media player as unread, and a multimedia file read by the net-media player as read;

step 4, the server retrieves whether an unread marker exists, if yes, transmitting an information reminding instruction to the net-media player corresponding to the username of the client, the net-media player sending out an information reminding signal; and if no, not transmitting the information reminding instruction;

step 5, a remote controller receives a key signal outputted by a second username, and determines whether the key signal is a first playing signal or a second playing signal; wherein if the key signal is the first playing signal, the remote controller converts the first playing signal to a first control signal, and transmits the first control signal to the net-media player, and the net-media player executes step 6; if the key signal is the second playing signal, the remote controller converts the second playing signal to a second control signal, and transmits the second control signal to the net-media player, and the net-media player executes step 7;

step 6, the net-media player reads the multimedia file with an unread marker from the specified storage space based on the first control signal, and plays the multimedia file with the unread marker via a television in descending order of uploading time; and step 7, the net-media player reads the multimedia file corresponding to the multimedia classification marker of the second control signal from the specified storage space corresponding to the username of the client, based on the multimedia classification marker of the second control signal, and plays the corresponding multimedia file via the television in descending order of uploading time;

Preferably, wherein the multimedia file includes audio, video, image or text; and the multimedia-file uploading interface includes an audio uploading interface, a video uploading interface, an image uploading interface or a text uploading interface;

preferably, wherein the information reminding signal includes a sound reminding signal or/and light reminding signal;

preferably, wherein the client is a telephone, a tablet computer, a laptop or a PDA (personal digital assistant);

preferably, wherein the server is a cloud server;

A one-button information interactive system, comprising:

a client, a net-media player, a remote controller, a television and a server;

wherein the client and the net-media player are respectively connected with the server via internet; the remote controller is connected with the net-media player via a wireless signal; and the net-media player is connected with the television via a signal wire; and wherein the net-media player has an information reminder; the remote controller has buttons for playing the multimedia files; and the workflow of the system comprises:

step 1, the client establishes communication with the server, and the server gets a username of the client;

step 2, based on a multimedia-file uploading interface activated by a first user, the client adds a corresponding multimedia classification marker to a file header of a multimedia file selected by the first user, and uploads the multimedia file with the multimedia classification marker to the server;

step 3, the server saves the multimedia file in the specified storage space based on the username of the client and the multimedia classification marker, and marks a multimedia file which has not been read by the net-media player as unread, and a multimedia file read by the net-media player as read;

step 4, the server retrieves whether an unread marker exists, if yes, transmitting an information reminding instruction to the net-media player corresponding to the username of the client, the net-media player sending out an information reminding signal; and if no, not transmitting the information reminding instruction;

step 5, the remote controller receives a key signal outputted by a second username, and determines whether the key signal is a first playing signal or a second playing signal; wherein if the key signal is the first playing signal, the remote controller converts the first playing signal to a first control signal, and transmits the first control signal to the net-media player, and the net-media player executes step 6; if the key signal is the second playing signal, the remote controller converts the second playing signal to a second control signal, and transmits the second control signal to the net-media player, and the net-media player executes step 7;

step 6, the net-media player reads the multimedia file with an unread marker from the specified storage space based on the first control signal, and plays the multimedia file with the unread marker via the television in descending order of uploading time; and step 7, the net-media player reads the multimedia file corresponding to the multimedia classification marker of the second control signal from the specified storage space corresponding to the username of the client, based on the multimedia classification marker of the second control signal, and plays the corresponding multimedia file via the television in descending order of uploading time.

preferably, wherein the information reminder includes a speaker or/and indication light;

preferably, wherein the wireless signal can be infrared signal, Bluetooth signal, radio-frequency signal or Zigbee signal;

preferably, wherein the multimedia file includes audio, video, image or text; and the multimedia-file uploading interface includes an audio uploading interface, a video uploading interface, an image uploading interface or a text uploading interface; and preferably, wherein the server is a cloud server.

Beneficial effects of the present invention are as follows:

The elderly living alone can watch images, videos, messages, audios and so on transmitted by the children far away in time by pressing one button on the remote controller, which can make it convenient for the elderly to communicate with the children far away.

DETAILED DESCRIPTION OF THE PREFERRED EMBODIMENTS

Figure 1:
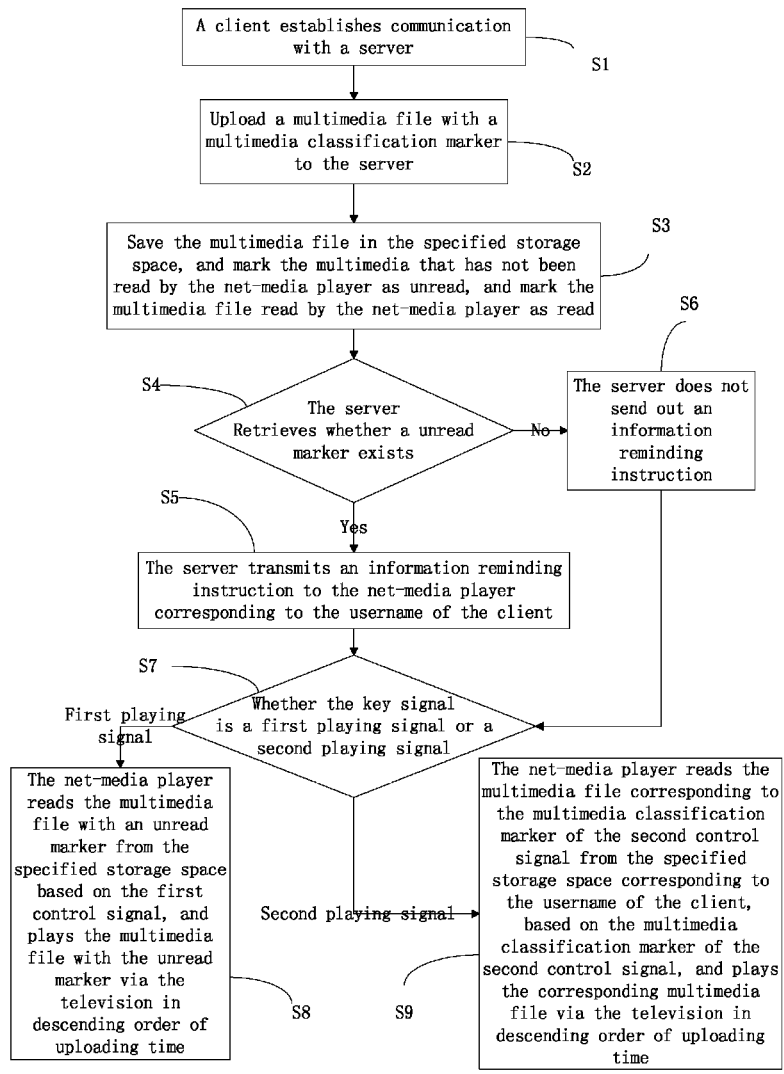
FIG. 1 is a flow chart of embodiments of a one-button information interactive method.

Referring to the FIG. 1, a one-button information interactive method includes steps as follow:

Step S1, a client establishes communication with a server, and the server gets a username of the client. For example, the client logs in the server with the username and a password, and the server can get the username corresponding to the client. Based on presets, the username binds to a specified storage space, namely a storage path in the server, and binds to a corresponding net-media player. Specifically, the username can binds to the net-media player by setting an IP address.

Step S2, based on a multimedia-file uploading interface activated by a first user, namely the children far off, the client adds a corresponding multimedia classification marker to a file header of a multimedia file selected by the first user, and uploads the multimedia file with the multimedia classification marker to the server. The multimedia file includes audio, video, image or text. The multimedia-file uploading interface includes an audio uploading interface, a video uploading interface, an image uploading interface or a text uploading interface. For example, children activate the image uploading interface, and select one or more images. Then the client will add the corresponding multimedia classification markers to the file headers of those selected images, that is, classification markers indicating image will be added to the file headers of the images. For example, 01X indicates image, and 02X indicates video, and so on. In other words, the multimedia classification markers include image type, video type, audio type and text type.

Step S3, the server saves the multimedia file in the specified storage space based on the username of the client and the multimedia classification marker, and marks a multimedia file which has not been read by the net-media player as unread, and a multimedia file read by the net-media player as read. For example, based on the username, the server can know that the storage path is '/user/ . . . ', and saves the multimedia file in a corresponding file based on the multimedia classification marker. For instance, the server saves the image in a photograph file based on a storage path '/user/photo/', or saves the video in a video file based on a storage path '/user/video/', and so on. In addition, all the multimedia files may be directly saved in a file instead of classifiable storage.

Step S4, the server retrieves whether an unread marker exists, if yes, executing step S5, and if no, executing step S6. In other words, the server retrieves all reading-state markers in the storage space.

Step S5, the server transmits an information reminding instruction to the net-media player corresponding to the username of the client, so that the net-media player sends out an information reminding signal. The net-media player has an information reminder which includes a speaker or/and indication light. Correspondingly, the information reminding signal includes a sound reminding signal or/and light reminding signal. In other words, after the server transmits the information reminding instruction to the net-media player, the net-media player responds to the information reminding instruction, and controls the information reminder to operate, for example, the speaker or the indication light is activated to remind the elderly in time that new messages have been uploaded by the children.

Step S6, the server does not transmit the information reminding instruction.

Step S7, a remote controller receives a key signal outputted by a second username, namely the elderly, and determines whether the key signal is a first playing signal or a second playing signal. If the key signal is the first playing signal, the remote controller converts the first playing signal to a first control signal, and transmits the first control signal to the net-media player, so that the net-media player executes step S8. If the key signal is the second playing signal, the remote controller converts the second playing signal to a second control signal, and transmits the second control signal to the net-media player, so that the net-media player executes step S9. For example, when the elderly pays attention to the indication sound and light, he/she knows that new messages have been uploaded, and just presses a playing button on the remote controller to generate a first playing signal. If the elderly would like to read a read message, he/she can press an image button, an audio button, a video button or a text button to generate a second playing signal. Responding to the activation by the image button, the audio button, the video button or the text button, the second playing signal has information of a corresponding multimedia classification marker.

Step S8, the net-media player reads the multimedia file with an unread marker from the specified storage space based on the first control signal, and plays the multimedia file with the unread marker via a television in descending order of uploading time. Then the elderly can watch the new multimedia file by pressing one button, and watch them in descending order of uploading time.

Step S9, the net-media player reads the multimedia file corresponding to the multimedia classification marker of the second control signal from the specified storage space corresponding to the username of the client, based on the multimedia classification marker of the second control signal, and plays the corresponding multimedia file via the television in descending order of uploading time. In other words, according to what the elderly does in step S7, the second control signal has corresponding multimedia classification marker. For example, the elderly press the image button, thus the second control signal has the image classification marker. The server compares the multimedia classification marker of the second control signal with the multimedia classification of its saved multimedia files, to get a corresponding multimedia file, and reads the corresponding multimedia file. Then the elderly can watch the corresponding multimedia file by pressing one button, and watch them in descending order of uploading time.

Figure 2:
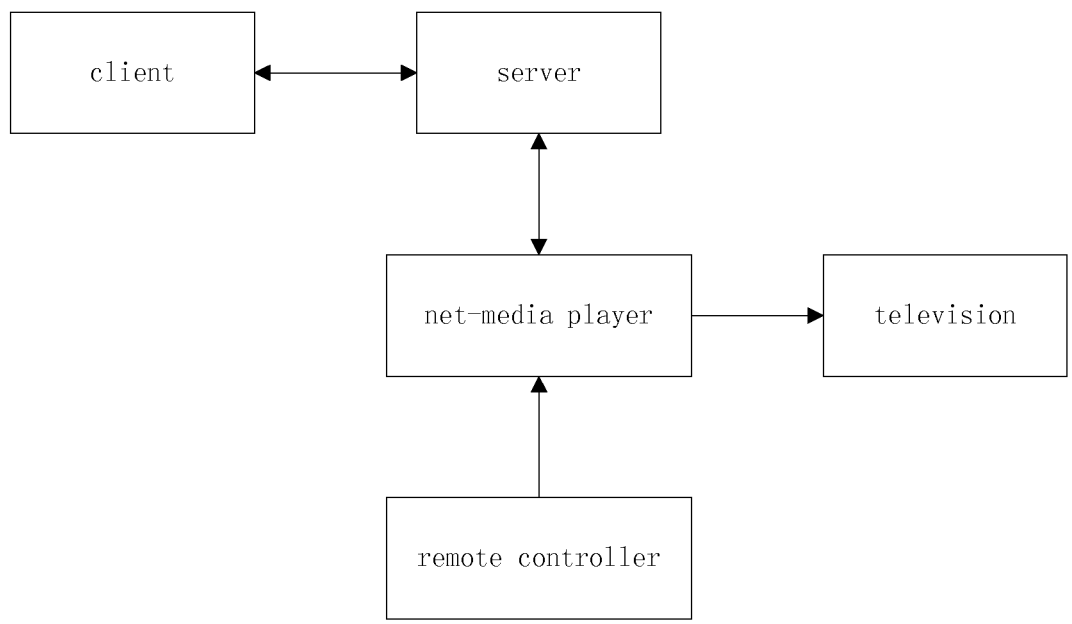
FIG. 2 is a schematic diagram of embodiments of a one-button information interactive system.

As shown in FIG. 2, an embodiment of a one-button information interactive system includes the client, the net-media player, the remote controller, the television and the server. The client and the net-media player are respectively connected with the server via internet. The remote controller is connected with the net-media player via a wireless signal. The net-media player is connected with the television via a signal wire. The net-media player has the information reminder. The remote controller has buttons for playing the multimedia files. The buttons includes the first button for generating the first control signal and the second buttons for generating the second control signal. The second buttons include the image button, the audio button, the video button and the text button.

The wireless signal can be infrared signal, Bluetooth signal, radio-frequency signal or Zigbee signal. The client can be a telephone, a tablet computer, a laptop or a PDA (personal digital assistant). The server can be a cloud server.

Various modifications could be made to the embodiments by those of ordinary skill in the art without departing from the true spirit and scope of the disclosure. And those modified embodiments are covered by the claims of the disclosure.

What is claimed is:

1. A one-button information interactive method, comprising:
   step 1, a client establishes communication with a server, and the server gets a username of the client;
   step 2, based on a multimedia-file uploading interface activated by a first user, the client adds a corresponding multimedia classification marker to a file header of a multimedia file selected by the first user, and uploads the multimedia file with the multimedia classification marker to the server;
   step 3, the server saves the multimedia file in the specified storage space based on the username of the client and the multimedia classification marker, and marks a multimedia file which has not been read by a net-media player as unread, and a multimedia file read by the net-media player as read;
   step 4, the server retrieves whether an unread marker exists, if yes, transmitting an information reminding instruction to the net-media player corresponding to the username of the client, the net-media player sending out an information reminding signal; and if no, not transmitting the information reminding instruction;
   step 5, a remote controller receives a key signal outputted by a second username, and determines whether the key signal is a first playing signal or a second playing signal; wherein if the key signal is the first playing signal, the remote controller converts the first playing signal to a first control signal, and transmits the first control signal to the net-media player, and the net-media player executes step 6; if the key signal is the second playing signal, the remote controller converts the second playing signal to a second control signal, and transmits the second control signal to the net-media player, and the net-media player executes step 7;
   step 6, the net-media player reads the multimedia file with an unread marker from the specified storage space based on the first control signal, and plays the multimedia file with the unread marker via a television in descending order of uploading time; and
   step 7, the net-media player reads the multimedia file corresponding to the multimedia classification marker of the second control signal from the specified storage space corresponding to the username of the client, based on the multimedia classification marker of the second control signal, and plays the corresponding multimedia file via the television in descending order of uploading time.

2. The one-button information interactive method of claim 1, wherein the multimedia file includes audio, video, image or text; and the multimedia-file uploading interface includes an audio uploading interface, a video uploading interface, an image uploading interface or a text uploading interface.

3. The one-button information interactive method of claim 1, wherein the information reminding signal includes a sound reminding signal or/and light reminding signal.

4. The one-button information interactive method of claim 1, wherein the client is a telephone, a tablet computer, a laptop or a PDA (personal digital assistant).

5. The one-button information interactive method of claim 1, wherein the server is a cloud server.

6. A one-button information interactive system, comprising:
   a client, a net-media player, a remote controller, a television and a server;
   wherein the client and the net-media player are respectively connected with the server via internet; the remote controller is connected with the net-media player via a wireless signal; and the net-media player is connected with the television via a signal wire; and
   wherein the net-media player has an information reminder; the remote controller has buttons for playing the multimedia files; and the workflow of the system comprises:
   step 1, the client establishes communication with the server, and the server gets a username of the client;
   step 2, based on a multimedia-file uploading interface activated by a first user, the client adds a corresponding multimedia classification marker to a file header of a multimedia file selected by the first user, and uploads the multimedia file with the multimedia classification marker to the server;
   step 3, the server saves the multimedia file in the specified storage space based on the username of the client and the multimedia classification marker, and marks a multimedia file which has not been read by the net-media player as unread, and a multimedia file read by the net-media player as read;
   step 4, the server retrieves whether an unread marker exists, if yes, transmitting an information reminding instruction to the net-media player corresponding to the username of the client, the net-media player sending out an information reminding signal; and if no, not transmitting the information reminding instruction;
   step 5, the remote controller receives a key signal outputted by a second username, and determines whether the key signal is a first playing signal or a second playing signal; wherein if the key signal is the first playing signal, the remote controller converts the first playing signal to a first control signal, and transmits the first control signal to the net-media player, and the net-media player executes step 6; if the key signal is the second playing signal, the remote controller converts the second playing signal to a second control signal, and transmits the second control signal to the net-media player, and the net-media player executes step 7;

step 6, the net-media player reads the multimedia file with an unread marker from the specified storage space based on the first control signal, and plays the multimedia file with the unread marker via the television in descending order of uploading time; and step 7, the net-media player reads the multimedia file corresponding to the multimedia classification marker of the second control signal from the specified storage space corresponding to the username of the client, based on the multimedia classification marker of the second control signal, and plays the corresponding multimedia file via the television in descending order of uploading time.

7. The one-button information interactive system of claim 6, wherein the information reminder includes a speaker or/and indication light.

8. The one-button information interactive system of claim 6, wherein the wireless signal can be infrared signal, Bluetooth signal, radio-frequency signal or Zigbee signal.

9. The one-button information interactive system of claim 6, wherein the multimedia file includes audio, video, image or text; and the multimedia-file uploading interface includes an audio uploading interface, a video uploading interface, an image uploading interface or a text uploading interface.

10. The one-button information interactive system of claim 6, wherein the server is a cloud server.

* * * * *